Patented Sept. 2, 1952

2,609,374

UNITED STATES PATENT OFFICE 2,609,374

PREPARATION OF N-SUBSTITUTED AMINO-METHYLSULFONIC ACIDS

Howard D. Hartough, Pitman, N. J., assignor to Socony-Vacuum Oil Company, Incorporated, a corporation of New York No Drawing. Application July 1, 1948, Serial No. 36,449

9 Claims. (Cl. 260—329)

The present invention relates to the preparation of N-substituted aminomethylsulfonic acids and, more particularly, relates to the preparation of N-thenylaminomethylsulfonic acids and the preparation of the corresponding thenyl-formaldimines from the N-substituted thenyl-aminomethylsulfonic acids.

Before describing the method of the present invention, it is desirable to provide the definitions of certain terms which will be used hereinafter.

In accordance with Steinkopf's nomenclature the thenyl radical is $C_4H_3SCH_2$— or

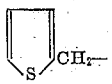

Consequently, the formula for N-thenylamino-methylsulfonic acids is $C_4H_3SCH_2NHCH_2SO_3H$ or where R represents $C_4H_3SCH_2$ the generic formula for thenylaminomethylsulfonic acids is $RNHCH_2SO_3H$. In the foregoing formula the thiophene nucleus may be substituted by at least one electropositive substituent. Consequently, in the formula $RNHCH_2SO_3H$ R may be either

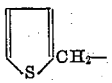

or

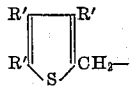

where R' is hydrogen or a stable electropositive substituent group. The production of amino-methylsulfonic acids corresponding to the formula

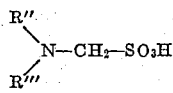

where R" is hydrogen, alkyl or aryl and R''' is R", hydrogen, alkyl or aryl is described in the copending application Serial No. 64,706, filed December 10, 1948, in the names of Joseph J. Dickert, Jr., and Howard D. Hartough. The preparation of thenylamines and related products is described in copending application for United States Letters Patent Serial No. 781,754, filed October 23, 1947, in the names of John W. Schick and Howard D. Hartough. In application for United States Letters Patent Serial No. 782,962, filed October 29, 1947, in the name of Howard D. Hartough the preparation of formaldimines of compounds having at least one hydrogen of pronounced reactivity from a compound of the aforesaid class, ammonium halide and aqueous formaldehyde is described. The present invention provides a means for producing N-substituted aminomethylsulfonic acids from which the corresponding thenylamines may be obtained in much higher overall yields than by the processes disclosed in the aforesaid Schick et al. and Hartough applications.

It is an object of the present invention to provide a means for preparing N-substituted thenyl-aminomethylsulfonic acids. It is another object of the present invention to provide a means for preparing N-thenylformaldimines and their polymers from N-thenylaminomethylsulfonic acids. The polymers so produced may range from two units to high molecular weight resinous material as described in the afore-identified Schick et al. copending application. Other objects and advantages will become apparent from the following description. In general, the present invention involves preparing aminomethyl-sulfonic acid, $NH_2CH_2SO_3H$ in the manner described in the aforesaid copending application for United States Letters Patent Serial No. 64,706, filed December 10, 1948, in the names of Joseph J. Dickert, Jr., and Howard D. Hartough. The aminomethylsulfonic acid thus obtained is then reacted with formaldehyde and with thiophene or a thiophene derivative having at least one unsubstituted nuclear hydrogen and having one to three electropositive substituent groups attached to the thiophene nucleus. The thenyl-aminosulfonic acid thus obtained is then decomposed to produce the corresponding form-aldimine. The foregoing may be readily visualized by examination of the following equations which are believed to represent the reactions.

I. Formation of Aminomethylsulfonic Acid.

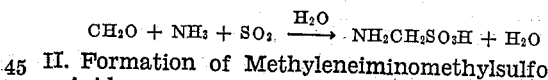

II. Formation of Methyleneiminomethylsulfonic Acid.

III. Formation of N-Substituted Aminomethyl-sulfonic Acid.

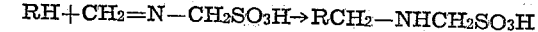

where R is an unsubstituted thiophene ring or a thiophene ring with one to three stable electropositive substituents.

IV. Formation of Formaldimine.

$RCH_2-NHCH_2SO_3H + 2NaOH \rightarrow$
$\quad\quad\quad RCH_2N=CH_2 + Na_2SO_3 + 2H_2O$ When thiophene is the reactant Equations III and IV may be written as follows:

V.

$C_4H_4S + CH_2=N-CH_2SO_3H \longrightarrow C_4H_3SCH_2-NHCH_2SO_3H$
$\quad\quad\quad\quad\quad\quad\quad\quad\quad\quad\quad\quad$ thenylaminomethyl sulfonic acid

VI.

$C_4H_3SCH_2-NHCH_2SO_3H + NaOH \longrightarrow$
$\quad\quad\quad (C_4H_3SCH_2N=CH_2)_n + NaHSO_3 + H_2O$
$\quad\quad\quad\quad$ thenylformaldimine where $n$ varies from 2 upward to a large value for the highly polymerized resins insoluble in benzene and $n$ varies 2 to 10 for benzene-soluble products.

Illustrative of the general reactions are the following non-limiting examples of the specific application of the principles of the present invention to the preparation of various thenylformaldimines including substituted thenylformaldimines in which the substituent is a stable electropositive group attached to the thiophene ring.

Example I

Aminomethylsulfonic acid (preferably obtained by the method described in the aforenoted copending application for United States Letters Patent Serial No. 64,706), 36 per cent aqueous solution of formaldehyde and thiophene are mixed in the proportion of 55 parts by weight of the sulfonic acid (about 0.5 mole), 50 parts by weight of the formaldehyde solution (about 0.6 mole) and 45 parts by weight of thiophene (about 0.54 mole). The well-stirred slurry of reactants was warmed to 60° C. at which temperature it suddenly solidified to such an extent that stirring was impossible. Water was then added and the mixture filtered. Causticizing the filtrate failed to yield formaldimines. Recrystallization of the material from water and alcohol failed because during heating required to dissolve the materials sulfur dioxide was evolved. Neutralization of the solution with sodium hydroxide yielded a semi-tacky resin which was only partially soluble in benzene. The benzene-insoluble portion, after drying, was found to contain 9.97 per cent nitrogen and 18.86 per cent sulfur. These values indicate the existence of a compound whose empirical formula contains approximately one sulfur atom (one thiophene residue) per atom of nitrogen and comparable to the resins prepared and described in copending applications Serial Nos. 781,754 and 763,744.

The foregoing reaction was repeated with this change: after cooling the solidified reaction mixture, the reaction mixture was diluted with ethanol and filtered to remove unreacted aminomethylsulfonic acid. The filtrate slowly crystallized on standing. The solid material was filtered off, washed with water, and dried over phosphorus pentoxide. The dried product melted at 135° to 137° C. with decomposition. There was no depression of the melting point of an authentic sample of 2-thenylaminomethylsulfonic acid when a portion of the product was melted therewith.

Example II

A mixture of about 0.5 mole of 2-methylthiophene, about 0.5 mole of aminomethylsulfonic acid, about 0.6 mole of formaldehyde (as a 36 per cent aqueous solution of formaldehyde) and about 5.5 moles of water was warmed to about 40° C. The source of external heat was removed. The temperature of the mixture rose to 52° C. and remained at that level for about 15 minutes when the reaction mixture totally solidified. The reaction mixture was cooled to ambient temperatures (15° to 25° C.) and water was added to provide a workable slurry. The diluted reaction mixture was then filtered. After drying about 94 parts by weight (110.5 parts by weight theoretical) of 5-methyl-2-thenylaminomethylsulfonic acid were obtained. This represents a yield of about 85 per cent of theoretical. A small portion of the product was recrystallized by saturating hot ethanol, quickly filtering off excess product and cooling the filtrate. The material, when purified by adding a few grams to about 50 milliliters of boiling alcohol, filtering, and chilling rapidly, melted at 138° to 140° C. with decomposition. The purified material was analyzed for nitrogen and sulfur with the following results: Nitrogen 6.34 per cent; sulfur 29.0 per cent. These values check, within the limit of error, those calculated for $C_7H_{11}NO_3S_2$ as is manifest from the following:

|  | Calculated | Found |
| --- | --- | --- |
| Nitrogen per cent | 6.34 | 6.65 |
| Sulfur per cent | 29.0 | 29.2 |

A small portion of the foregoing product was treated with an excess of caustic, the viscous, water-insoluble oil so obtained was dissolved in ether and the ether evaporated. The light-yellow, semi-crystalline, viscous oil was dissolved in ethanol and a little water. Crystals slowly formed which had a melting point of 87° to 88° C. A mixed melting point determination on a mixture of the aforesaid product and an authentic sample of the trimer of N-(5-methyl-2-thenyl)formaldimine (M. P. 86.5° to 87° C.) gave no depression of the melting point. Consequently, it is manifest that the product obtained is the trimer of N-(5-methyl-2-thenyl)formaldimine $(CH_3C_4H_2S-CH_2N=CH_2)_3$. Evaporation of the mother liquor yielded only a minor amount of yellow oil that crystallized rapidly into the aforesaid trimer.

It should be noted at this point that an authentic sample of the trimer $(CH_3C_4H_2S-CH_2N=CH_2)_3$ has been prepared previously as described in copending application for United States Letters Patent Serial No. 782,962, in a 30 per cent to 40 per cent yield and always accompanied by a 50 per cent to 60 per cent yield of di-(5-methyl-2-thenyl)amine hydrochloride. In contrast to these reported results an 85 per cent yield of the formaldimine is obtained with little or no contaminating amine. Thus, it is manifest that the present process provides a very practical improved method for preparing the formaldimines of compounds capable of participating in the Mannich reaction, i. e., compounds having at least one hydrogen atom of pronounced reactivity.

Example III 5-chloro-2-thenylaminomethylsulfonic acid and N-(5-chloro-2-thenyl)formaldimine were prepared in the following manner. A mixture of about 0.5 mole of 2-chlorothiophene,

about 0.5 mole of aminomethylsulfonic acid, $NH_2CH_2SO_3H$, and about 0.58 mole of formaldehyde (36 per cent aqueous solution) was stirred at about 70°–75° C. for about two hours. The mixture was then cooled to ambient temperatures, about 5.5 moles of water were added, i. e., sufficient to provide a workable slurry, and the crystalline material separated and dried. The yield was about 31 per cent of the theoretical of the crude 5-chloro-2-thenylaminomethylsulfonic acid, $ClC_4H_2SCH_2NHCH_2SO_3H$. A pure sample, obtained by adding a few grams of the crude product to boiling alcohol, filtering, and rapidly chilled, melted at 142°–143° C. with decomposition and had a nitrogen content of 6.06 per cent and a sulfur content of 26.3 (calculated for $C_5H_8ClNO_3S_2$ nitrogen 5.80 per cent, and sulfur 26.5 per cent). About one-third of the 2-chlorothiophene was recovered, unreacted, from the filtrate. In addition, a trace of amine was recovered from the filtrate after caustic neutralization as a thick, syrupy red liquid the quantity of which did not permit analysis.

A portion of the crystalline material obtained as described hereinbefore was treated with caustic solution and the viscous oil formed thereby was dissolved in ethyl ether. The ethereal solution was dried over anhydrous calcium sulfate and the ether evaporated to yield a yellow viscous amine. Characteristic of the thenylformaldimines, this viscous amine, when warmed with dilute hydrochloric acid gave the characteristic odor of formaldehyde. The viscous amine was analyzed for sulfur and found to contain 18.7 per cent sulfur. Chlorothenylformaldimine, $$ClC_4H_2SCH_2N{=}CH_2 \; (C_6H_6ClSN)$$

theoretically contains 20 per cent sulfur.

*Example IV*

Eleven parts by weight of aminomethylsulfonic acid, 20 parts of water, and 10 parts of 36 per cent aqueous formaldehyde were warmed on a steam bath to 70°–75° C. This mixture was then removed and shaken for about three minutes until the larger portion of the aminomethylsulfonic acid dissolved. The mixture was cooled to 45° C. and 10 parts of 3-methylthiophene were added. The mixture was vigorously shaken for about five minutes until it solidified. Twenty parts of water was added and the shaking was continued until this new slurry solidified completely. The mixture was then cooled and filtered. An analytical sample, melting at 140°–141° C. with decomposition, was prepared as described above by recrystallization from boiling alcohol. The material recrystallized from boiling alcohol was analyzed and found to contain 6.49 per cent nitrogen and 28.0 per cent sulfur. This compares, within the limit of error, with the nitrogen and sulfur content of the methylthenylaminomethylsulfonic acid having the empirical formula $C_7H_{11}NO_3S_2$ as is manifest from the following tabulation:

|  | Calculated | Found |
|---|---|---|
| Nitrogen per cent | 6.34 | 6.49 |
| Sulfur per cent | 29.0 | 28.0 |

Decomposition of this material with caustic gives a white thermoplastic resin of 3-methyl-2-thenylformaldimine.

It is of interest to note that 2-chlorothiophene did not react with ammonium halide and aqueous formaldehyde and that only low yields of various amines were obtained from polymeric formaldehyde using acetic acid as a solvent. Since in this latter reaction di-(5-chloro-2-thenyl)amine hydrohalide is the primary product, the foregoing method is highly preferred when the N-(5-chloro-2-thenyl)formaldimine is the desired product.

It will be recognized by those skilled in the art that the preparation of methylthenylaminomethylsulfonic acid and the corresponding formaldimine N - (methyl - 2 - thenyl) formaldimine from 2-methylthiophene together with the preparation of the analogous products from 2-chlorothiophene is illustrative of the preparation of N-substituted thenylaminomethylsulfonic acids and substituted N-thenylformaldimines in which the substituent groups attached to the thiophene ring are stable electropositive groups.

The preparation of N-(3-methyl-2-ethenyl) aminomethylsulfonic acid and the corresponding formaldimines from 3-methylthiophene, formaldehyde and aminomethylsulfonic acid establishes that the reaction illustrated by Example IV is general for thiophene derivatives having the electropositive substituent in the 3-position and having at least one nuclear hydrogen of pronounced reactivity. In general, the process involves reacting thiophene or a thiophene having stable electropositive substituents attached to the ring and having at least one unsubstituted ring hydrogen of pronounced reactivity, formaldehyde and aminomethylsulfonic acid in aqueous solution to obtain the N-substituted aminomethylsulfonic acid and hydrolyzing the thus obtained aminomethylsulfonic acid to obtain the corresponding formaldimine.

The reaction between the aminomethylsulfonic acid, formaldehyde and thiophene or thiophene derivative of the class described hereinbefore is carried out at about 20° to 70° C. The hydrolysis of the resultant thenylaminomethylsulfonic acid is carried out at about 20° to about 80° C. The hydrolysis of the substituted aminomethylsulfonic acid may be carried out in the presence of water, alcohol, or in the presence of a base such as caustic soda, ammonia and the like. When the hydrolysis is carried out in the absence of a base, i. e., in the presence of water or an alcohol, sulfur dioxide is evolved as indicated by the following equation:

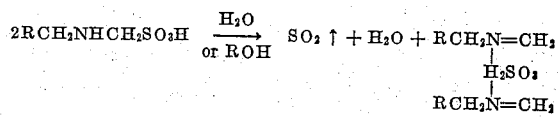

In other words, in the absence of a base, the formaldimine is present as a compound corresponding to the normal salt. An analogous salt of this type is ammonium sulfite, $(NH_4)_2SO_3$ or $(NH_3)_2 \cdot H_2SO_3$. Consequently, when the hydrolysis is carried out in the absence of a base, a base must be added to free the formaldimine from the salt. Any base such as ammonia or stronger bases is suitable for this neutralization. Of course, when the hydrolysis of the substituted aminomethylsulfonic acid is carried out in the presence of a base, the formaldimine appears as the free amine.

I claim:
1. A method for preparing compounds having the formula,

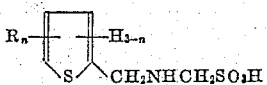

wherein R is a substituent selected from the group consisting of lower alkyl radicals and halogen atoms, and $n$ is an integer of from 0 to 1, which comprises reacting, at a temperature of between about 20° C. and about 70° C., in aqueous medium, aminomethylsulfonic acid, formaldehyde, and one of the group consisting of thiophene and thiophene compounds having the formula,

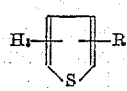

wherein R is a substituent selected from the group consisting of lower alkyl radicals and halogen atoms and H is hydrogen, at least one of which is of pronounced reactivity; and separating the N-thenylaminosulfonic acid corresponding to the formula,

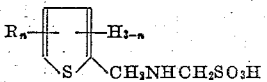

2. A method for preparing thenylaminomethylsulfonic acid which comprises reacting aminomethylsulfonic acid, formaldehyde and thiophene in aqueous medium, and separating the thenylaminomethylsulfonic acid so produced.

3. A method for preparing N-(5-methyl-2-thenyl)aminomethylsulfonic acid which comprises reacting 2-methylthiophene, aminomethylsulfonic acid and formaldehyde in aqueous medium, and separating N-(5-methyl-2-thenyl) aminomethylsulfonic acid so produced.

4. A method for preparing N-(5-chloro-2-thenyl(aminomethylsulfonic acid which comprises reacting 2-chlorothiophene, formaldehyde and aminomethylsulfonic acid, and separating the so obtained N-(5-chloro-2-thenyl)aminomethylsulfonic acid.

5. N-thenylaminomethylsulfonic acid having a melting point of 135° to 137° C. with decomposition.

6. N-(5-methyl-2-thenyl) aminomethylsulfonic acid having a melting point of 138° to 140° C. with decomposition.

7. N-(5 - chloro-2-thenyl) aminomethylsulfonic acid having a melting point of 142° to 143° C. with decomposition.

8. N-(3-methyl-2-thenyl) aminomethylsulfonic acid having a melting point of 140° to 141° C. with decomposition.

9. Thenylaminosulfonic acids having the formula,

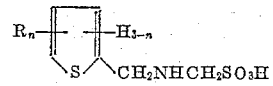

wherein R is a substituent selected from the group consisting of lower alkyl radicals and halogen atoms, and $n$ is an integer of from 0 to 1.

HOWARD D. HARTOUGH.

REFERENCES CITED

The following references are of record in the file of this patent:

UNITED STATES PATENTS

| Number | Name | Date |
| --- | --- | --- |
| 2,109,401 | Nicodemus | Feb. 22, 1938 |

OTHER REFERENCES

Hartough: J. Am. Chem. Soc. 70, 1146–1149 (1948).